Patented June 1, 1937

2,082,105

UNITED STATES PATENT OFFICE 2,082,105

PRODUCTION OF ALIPHATIC AMINES

Paul Herold and Karl Smeykal, Leuna, Germany, assignors to I. G. Farbenindustrie Aktiengesellschaft, Frankfort-on-the-Main, Germany No Drawing. Application December 13, 1932, Serial No. 646,975. In Germany, December 30, 1931

7 Claims. (Cl. 260—127)

The present invention relates to the production of aliphatic amines.

It has already been proposed to prepare aliphatic amines by leading the corresponding aliphatic alcohols together with gaseous ammonia over catalysts capable of splitting off water from organic hydroxylated compounds, as for example thorium oxide or aluminium oxide, at temperatures of from 350° to 400° C., the amines being obtained by condensing the reaction product. Especially when higher alcohols, that is those having more than four carbon atoms in the molecule are subjected to the said reaction, only comparatively small yields of amines, usually only from 20 to 30 per cent of the theoretical yields, are obtained.

According to the British Patents Nos. 317,079 and 334,579 the reaction may be carried out in the presence of certain hydrogenation catalysts, such as nickel, if desired at a pressure above atmospheric pressure.

We have now found that the yield of amines when working with higher alcohols, that is aliphatic, cycloaliphatic and aliphatic-aromatic alcohols containing more than 4 carbon atoms in the molecule, as for example primary, secondary or tertiary alcohols with straight or branched chains, such as n- or iso-amyl, hexyl, and heptyl alcohols, cyclohexanol and benzyl alcohol, is substantially increased when the reaction is carried out at a pressure of at least 10 atmospheres in the presence of dehydrating catalysts, that is of catalysts capable of assisting the splitting off of water from organic hydroxylated compounds. In this manner a conversion of the said alcohols into aliphatic amines amounting for example to up to 90 per cent of the theoretical conversion is accomplished. This thoroughly favourable course of the reaction when employing increased pressure could not be foreseen because the said conversion does not proceed with a diminution in the molecular number.

The catalysts, capable of splitting off water from organic hydroxylated compounds, comprise for example metal oxides, such as thorium oxide, aluminium oxide or tungstic oxide, or silica gel, or suitable salts having a dehydrating action, such as aluminium phosphate and mixed alkali aluminium silicates as are known as base exchangers for use in softening hard water and mixtures of the said salts with oxides as for example mixtures of alumina and aluminium phosphate. They may be employed either alone or fixed on inert carrier materials, such as granulated pumice, or in admixture with substances capable of improving the mechanical strength of the catalysts, for example zinc phosphate or kaolin.

Generally speaking, it is preferable to work with a reaction temperature of from about 300° to about 380° C., and at about 450° C., for example above 100 atmospheres, preferably of a pressure of 200 atmospheres, or more, for example 500, 800 or 1000 atmospheres, as well as with a large excess of ammonia for example 3 to 10 molecular proportions of ammonia for 1 molecular proportion of alcohol. Single higher alcohols, such as hexyl alcohol, as well as mixtures of different higher alcohols, or a fraction boiling above 120° C. of the oxygen containing reaction product obtainable by the hydrogenation of oxides of carbon, for example according to the British Patent No. 238,319, may be advantageously employed as initial material. This fraction consists for the greater part of aliphatic alcohols containing an average number of carbon atoms between 5 and 12 in admixture with aldehydes, ketones and other oxygen-containing organic substances. The presence of these non-alcoholic compounds has no injurious influence on the catalytic conversion of the ammonia with the alcohols to form amines, consequently the said oxygen-containing products of the hydrogenation of oxides of carbon, which by reason of their unpleasant odour are only difficultly capable of commercial exploitation, may be easily converted according to this invention, without previous purification, into amines which are valuable organic intermediate products, for example for the manufacture of assistants for the textile industry. The mixture of amines obtained may be freed from non-basic constituents for example by dissolution in mineral acid and subsequent precipitation by means of caustic alkali.

The following examples will further illustrate the nature of this invention but the invention is not restricted to these examples.

Example 1

Liquid anhydrous ammonia together with the same volume of a fraction boiling between 135° and 150° C. of a product rich in higher alcohols, obtained according to the British Patent No. 238,319 by the hydrogenation of carbon monoxide and consisting mainly of primary iso-amyl and primary iso-hexyl alcohols and to the extent of about 20 per cent of secondary iso-hexyl alcohols, is pressed into a pressure-resisting vaporizer and the mixture is led in the vapour phase at 200 atmospheres through a pressure-resisting tube lined with copper and heated to 380° C. which is filled with grains of hydrated alumina having a diameter of from about 4 to 10 millimetres. The quantity of alcoholic raw material which is led through the tube is so regulated that it amounts per hour to one half of the volume of the catalyst. The liquid reaction product condensed in a pressure-resisting receiver is withdrawn continuously while releasing the pressure. The condensate consists of an aqueous and an oily layer. The latter contains 85 per cent, by weight, of aliphatic amines boiling between 100° and 200° C.; the remainder which is insoluble in dilute aqueous solutions of acids, consists mainly of unsaturated hydrocarbons. The amines may be separated in the usual manner from the unsaturated hydrocarbons by dissolution with somewhat more than the calculated amount of dilute aqueous hydrochloric acid and may be recovered as such by subsequent precipitation from the aqueous solution with caustic alkalies after separating from the layer of undissolved by-products.

*Example 2*

Commercial amyl alcohol having a boiling point from 128° to 131° C. (at atmospheric pressure) is mixed with an equal volume of liquid, anhydrous ammonia, the mixture being then vaporized at a pressure of 200 atmospheres. The vapours are passed at 400° C. and at a pressure of 200 atmospheres over a catalyst consisting of hydrated alumina, the reaction products being condensed and continuously removed from the receiver by releasing the pressure. The reaction product consists of an aqueous and of an oily layer. The latter contains, to the extent of 90 per cent, aliphatic amines, 70 per cent of which is iso-amylamine and about 30 per cent of which is di-isoamylamine. The separation of the amines from the non-basic constituents of the reaction product is carried out as described in Example 1 by treating the oily, crude reaction product with dilute hydrochloric acid.

*Example 3*

Iso-heptyl alcohol (4-methyl-1-hexanol having a boiling point of 165° C.) is mixed with 1.5 times its volume of liquid ammonia, the mixture being then vaporized at a pressure of 200 atmospheres. The mixture of vapours is then passed at 200 atmospheres through a pressure-resisting reaction vessel which contains pieces of hydrated alumina as a catalyst and is heated to 400° C. The reaction products are condensed and continuously removed from the pressure-resisting receiver by releasing the pressure. An aqueous and an oily layer are obtained, the latter of which contains aliphatic amines to the extent of 65 per cent. 80 per cent of the amines is mono- iso-heptyl amine and about 20 per cent is di-iso-heptyl amine. The amines are separated from the non-basic constituents in the manner described in the foregoing examples.

What we claim is:—

1. In the production of amines by heating alcohols with more than equimolecular amounts of ammonia at from about 300° to about 450° C. in the presence of a dehydrating catalyst, the improvement which comprises starting with a fraction boiling above 120° C. of an oxygen-containing reaction product obtainable by the catalytic hydrogenation of carbon oxides as the alcoholic component and carrying out the said reaction at a pressure of at least 10 atmospheres.

2. In the production of amines by heating alcohols with more than equimolecular amounts of ammonia at from about 300° to about 450° C. in the presence of a dehydrating catalyst, the improvement which comprises starting with a fraction boiling above 120° C. of an oxygen-containing reaction product obtainable by the catalytic hydrogenation of carbon oxides as the alcoholic component and carrying out the said reaction at a pressure between about 100 and about 500 atmospheres.

3. In the production of amines by heating alcohols with more than equimolecular amounts of ammonia at from about 300° to about 450° C. in the presence of a dehydrating catalyst, essentially comprising a metal oxide, the improvement which comprises starting with a fraction boiling above 120° C. of an oxygen-containing reaction product obtainable by the catalytic hydrogenation of carbon oxides as the alcoholic component and carrying out the said reaction at a pressure between about 100 and about 500 atmospheres.

4. In the production of amines by heating alcohols with more than equimolecular amounts of ammonia at from about 300° to about 450° C. in the presence of a dehydrating catalyst, essentially comprising hydrated alumina, the improvement which comprises starting with a fraction boiling above 120° C. of an oxygen-containing reaction product obtainable by the catalytic hydrogenation of carbon oxides as the alcoholic component and carrying out the said reaction at a pressure between about 100 and about 500 atmospheres.

5. In the production of amines by heating one molecular proportion of alcohols with at least three molecular proportions of ammonia at from about 300° to about 450° C. in the presence of a dehydrating catalyst, the improvement which comprises starting with a fraction boiling above 120° C. of an oxygen-containing reaction product obtainable by the catalytic hydrogenation of carbon oxides as the alcoholic component and carrying out the said reaction at a pressure of at least 10 atmospheres.

6. In the production of amines by heating one molecular proportion of alcohols with at least three molecular proportions of ammonia at from about 300° to about 450° C. in the presence of a dehydrating catalyst, the improvement which comprises starting with a fraction boiling above 120° C. of an oxygen-containing reaction product obtainable by the catalytic hydrogenation of carbon oxides as the alcoholic component and carrying out the said reaction at a pressure between about 100 and about 500 atmospheres.

7. In the production of amines by heating one molecular proportion of alcohols with at least three molecular proportions of ammonia at from about 300° to about 450° C. in the presence of a dehydrating catalyst, essentially comprising hydrated alumina the improvement which comprises starting with a fraction boiling above 120° C. of an oxygen-containing reaction product obtainable by the catalytic hydrogenation of carbon oxides as the alcoholic component and carrying out the said reaction at a pressure between about 100 and about 500 atmospheres.

PAUL HEROLD.
KARL SMEYKAL.